United States Patent
Rhodes

[15] 3,668,118
[45] June 6, 1972

[54] OIL MOP AND METHOD OF USING SAME
[72] Inventor: Herbert M. Rhodes, New Orleans, La.
[73] Assignee: Oil Mop International, Inc.
[22] Filed: July 6, 1970
[21] Appl. No.: 52,448

[52] U.S. Cl. ........................210/30, 210/40, 210/DIG. 21
[51] Int. Cl. .......................................................E02b 15/04
[58] Field of Search .............87/7, 8; 161/169, 172; 210/30, 210/40, 242, DIG. 21

[56] References Cited

UNITED STATES PATENTS 3,539,013   11/1970   Smith.......................................210/242
3,565,257    2/1971   Cavalieri..................................210/242

FOREIGN PATENTS OR APPLICATIONS 1,187,605    4/1970   Great Britain..................210/DIG. 21

Primary Examiner—Reuben Friedman
Assistant Examiner—Thomas G. Wyse
Attorney—Wilkinson, Mawhinney & Theibault

[57] ABSTRACT

The present disclosure is directed to a method of removing oil from the surface of a body of water with an oil mop made of thin gauge narrow strips of polypropylene or similar material passed through the oil on the surface of water and then through wringers and/or water or chemical sprays or both to remove the oil from the mop, depositing the oil in a receptacle and returning the non-oil ladened mop back into the oil covered water to pick up more surface oil.

9 Claims, 4 Drawing Figures

PATENTED JUN 6 1972

INVENTOR
HERBERT M. RHODES

BY Wilkinson, Mawhinney & Theibault
ATTORNEYS

INVENTOR
HERBERT M. RHODES

OIL MOP AND METHOD OF USING SAME

An object of the present invention is the provision of AN OIL MOP AND METHOD OF USING SAME for removal of oil pollution when oil becomes accidentally spilled on the surface of a body of water either due to a drilling accident, casement fracture or tanker collision where large quantities of oil endanger fish, wildlife and property.

Another object of the present invention is an improvement over the McClintock U. S. Pat. No. 3,146,192 which while recognizing that sheet polypropylene can selectively remove all the oil from a water surface in the ratio of 1 gram of oil per 16 square inches of polypropylene surface, taught the art its application only in a large bulky cumbersome rig which cannot be used effectively in rough open seas and which will not work effectively in shallow water or snow.

Accepting the physical principle announced in McClintock and realizing that it would be necessary to have huge unmanageable sheets of polypropylene to pick up any sizeable quantity of oil and that these sheets would be subject to wind, rain and sea conditions, I have invented a compact mass of thin gauge narrow strips of polypropylene in the form of a mop-like structure made into an endless line which when placed in the oil covered water has minimum resistance or no orientation requirements to sea and wind variables and which has the maximum amount of surface area of polypropylene to pick up oil in rough seas, shallow water and even snow.

With the foregoing and other objects in view, the invention will be more fully described hereinafter, and will be more particularly pointed out in the claims appended hereto.

In the drawings wherein like symbols refer to like or corresponding parts throughout the several views.

Figure 3:
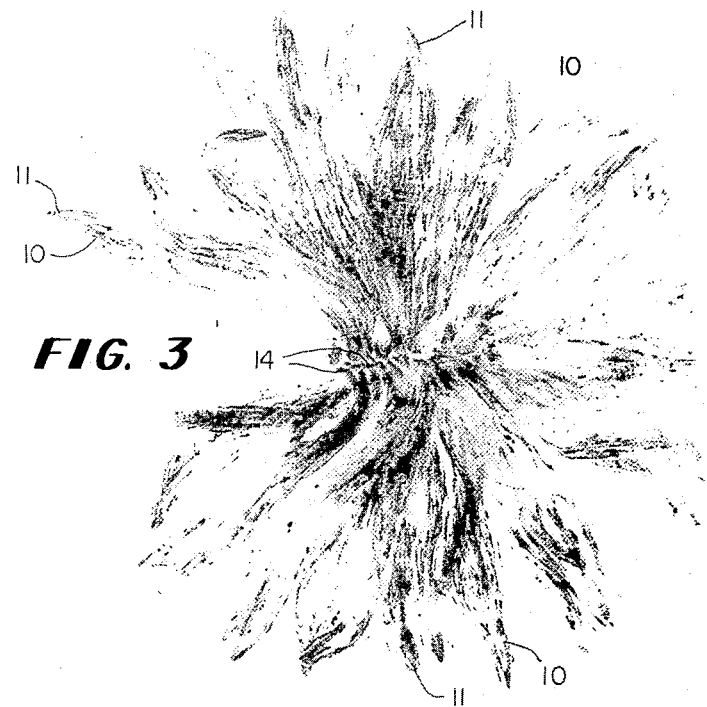
FIG. 3 is an end elevational view of the mop of the present invention showing the attachment of the groups of narrow polypropylene strips to a length of multi strand line.
Figure 4:
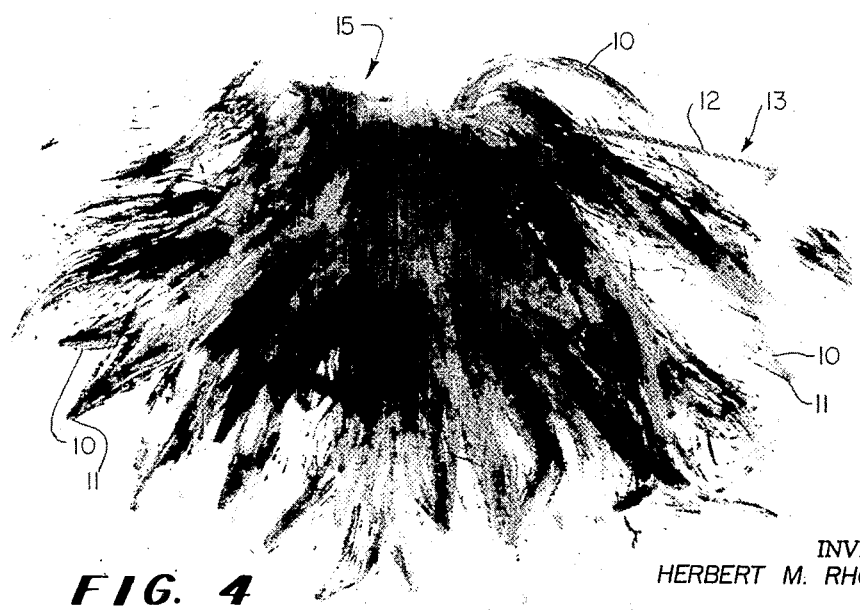
FIG. 4 is an end elevational view of the oil mop of the present invention showing the endless pull line broken away.

Referring to FIGS. 3 and 4, 10 designates a length of a plurality of thin gauge narrow strips of polypropylene, or similar material, having a specific gravity of less than 1, about 100 in number, the ends of which have been thermally fused at 11 to enhance the collection of oil. The groups 10 are cut from a length of tow which contains more than 100 strips in cross section. The lengths 10 may be from 2 to 5 feet in length. The lengths 10 are passed through or among the strands 12 of a multi strand polypropylene rope or line 13 and attached to the line 13 at 14. This construction constitutes the basic mop 15 which may be of any length in the direction of the line 13, for example one hundred or one thousand feet. The line 13 is spliced upon itself to make an endless mop.

Figure 2:
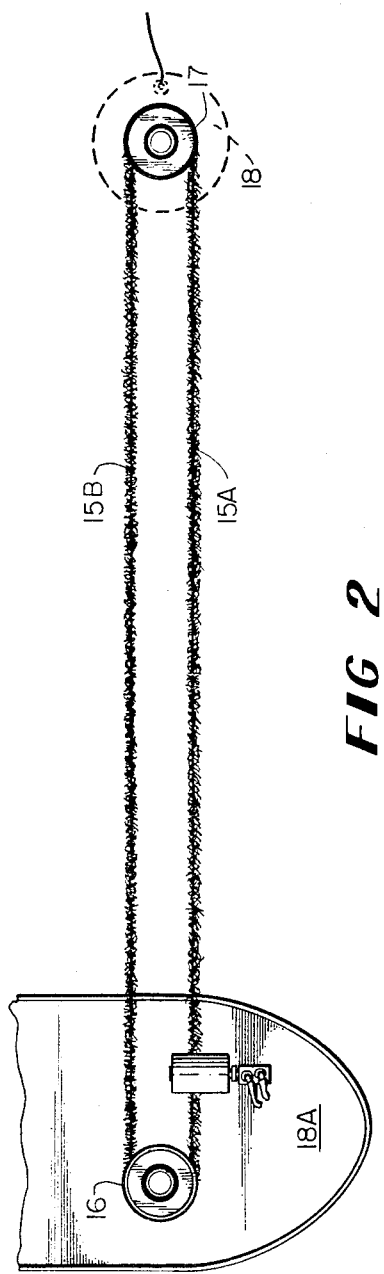
FIG. 2 is a top plan view of FIG. 1.
Figure 1:
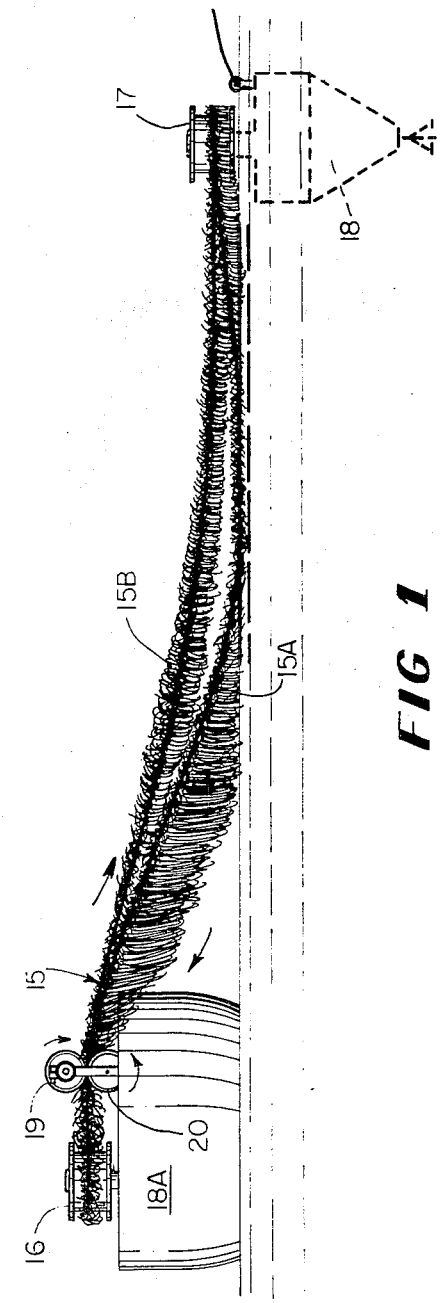
FIG. 1 is a side elevational view of an oil mop constructed in accordance with the present invention and shown being employed in accordance with the method.

As shown in FIGS. 1 and 2 the endless length of mop 15 is rooved about sheaves or pulleys 16 and 17 which are rotatably mounted on or near a barge or other support 18. Pulley 17 may be rotatably mounted on a buoy 18 which could be anchored or tied to a tug which would keep the mop partially taut and directed in the area where the oil pick up is desired. Located between the pulleys 16 and 17 and being closer to pulley 16 on oil recovery barge or receptacle 18A are a pair of pressurized power driven wringer rolls 19 and 20.

The barge or recovery receptacle 18A may be stationary, power driven, or towed to the polluted area and the mop 15 extended to the position of FIG. 1 with the run 15A being the pick up run and 15B being the return run.

The wringer rolls 19 and 20 when driven perform two functions firstly, to move the mop from pulley 17 toward pulley 16 while secondly, squeezing the oil from the mop 15. The oil recovered is drained into the receptacle beneath the wringer rolls.

The gauge of the thin narrow strips of polypropylene I have found to be most successful is 4 mils and a range of from 1 mil to 12 mils is operative. The width of the narrow strips averages one-eighth inches.

The cross section of the polypropylene strips may be circular, square or rectangular and all have performed satisfactorily. The diameter of the circular sizes tested is 1 mil to 12 mils. The widths of the rectangular cross sections tested has ranged from 4 mils to one-fourth inch with a thickness of 4 mils to 12 mils. The most successful operation that I have tested is with a 4 mil thickness with a range of widths of a few mils to one-fourth inch.

The most successful run on the mop to date has been 8 pounds of oil per pound of polypropylene per pass through the wringer.

What I claim is:

1. The method of removing oil liquid hydrocarbon compounds from the surface of a body of water comprising
    a. passing an endless line having multiple lengths of long narrow thin gauge strips of polypropylene directly attached to said line between a compressed pair of driven wringer rolls disposed above an oil collecting receptacle,
    b. keeping the line taut between two or more spaced apart sheaves disposed to each side of the wringer rolls, and
    c. moving the endless line with the long narrow strips of polypropylene in contact with the oil on the water surface so that the strips will pick up the oil from the water surface and move it to the wringer rolls where it will be squeezed from the strips and recovered in the receptacle.

2. The method of claim 1 comprising the further step of locating the endless line in the center of pull of the long narrow strips of polypropylene.

3. The method of removing oil from the surface of a body of water comprising making an oil mop by
    a. taking a tow containing a plurality of thin gauge narrow strips of polypropylene and cutting the tow into lengths,
    b. brading the lengths into a multi strand polypropylene line,
    c. making an endless line of the multi strand polypropylene,
    d. passing the endless line between a pair of driven wringer rolls disposed over an oil collecting receptacle and driving the rolls,
    e. providing sheave means proximate one side of the wringer rolls and sheave means at a remote point at the other side of the wringer rolls with the endless length of multi strand polypropylene line rooved about the sheaves, and
    f. exerting a force on each sheave in a direction away from each sheave to maintain the endless line taut, and
    g. moving the endless line containing the groups of narrow strips through the oil covered water to cause the oil to be picked up by the attraction between the polypropylene strips and the oil so that when strips containing oil on their surface are passed between the wringer rolls the oil will be squeezed therefrom and deposited in the receptacle.

4. The method of claim 3 wherein the length of narrow strips are attached into the endless length of multi strand polypropylene line so that the line is on the center of pull of the mass of polypropylene strips.

5. The method of removing oil from the surface of a body of water comprising the steps of
    a. disposing a plurality of lengths of polypropylene strip material along the length of a rope and directly attached thereto to leave ends of the lengths of the strip material free thereby forming a compact mass mop-like structure,
    b. fastening the so-arranged structure upon itself to form an endless structure,
    c. passing the endless structure along the surface of the water at least partially in contact with the oil, and
    d. wringing from the structure oil picked up from the water.

6. The method of claim 5 wherein the passing and wringing steps are performed continuously.

7. The method of claim 6 wherein the disposing step comprises, braiding the rope with the lengths of strip material.

8. The method of claim 7 comprising the further step of maintaining the endless structure taut during the passing step.

9. The method of using a mop-like structure for removing oil from the surface of a body of water comprising the steps of
   a. cutting a tow containing a plurality of thin-gauge narrow strips of polypropylene into lengths,
   b. braiding the so-cut lengths into a multistrand polypropylene line in the form of a compact mass of freely movable polypropylene strips for minimizing the surface area of polypropylene, and
   c. securing the so-braided line upon itself to make an endless line of the multi strand polypropylene,
   d. passing the so-braided line through oil on the surface of the water, and
   e. removing the oil from the strips of polypropylene.

* * * * *

UNITED STATES PATENT OFFICE
CERTIFICATE OF CORRECTION

Patent No. 3,668,118           Dated  June 6, 1972

Inventor(s)  HERBERT M. RHODES

It is certified that error appears in the above-identified patent and that said Letters Patent are hereby corrected as shown below:

Column 4, Claim 9, line 1, change "minimizing" to

--maximizing--.

Signed and sealed this 26th day of December 1972.

(SEAL)
Attest:

EDWARD M. FLETCHER, JR.                ROBERT GOTTSCHALK
Attesting Officer                       Commissioner of Patents

UNITED STATES PATENT OFFICE
CERTIFICATE OF CORRECTION

Patent No. 3,668,118         Dated June 6, 1972

Inventor(s) HERBERT M. RHODES

It is certified that error appears in the above-identified patent and that said Letters Patent are hereby corrected as shown below:

The assignee should read --OIL MOP, INC.--.

Signed and sealed this 17th day of September 1974.

(SEAL)
Attest:

McCOY M. GIBSON JR.
Attesting Officer

C. MARSHALL DANN
Commissioner of Patents